United States Patent
Fujiyama et al.

[11] Patent Number: 5,622,667
[45] Date of Patent: Apr. 22, 1997

[54] PROCESS FOR PRODUCING SKIN-INTEGRATED LAMINATE

[75] Inventors: Youichi Fujiyama, Nagoya; Takashi Watanabe, Toyota; Masahito Matsumoto, Ibaraki; Ryuichi Ishitsubo, Izumi, all of Japan

[73] Assignees: Sumitomo Chemical Company, Limited, Osaka; Takashimaya Nippatsu Kogyo Co., Ltd., Toyota; Hosokawa Seisakusho Co., Ltd., Osaka, all of Japan

[21] Appl. No.: 318,732
[22] PCT Filed: Feb. 14, 1994
[86] PCT No.: PCT/JP94/00211
§ 371 Date: Oct. 13, 1994
§ 102(e) Date: Oct. 13, 1994
[87] PCT Pub. No.: WO94/19165
PCT Pub. Date: Sep. 1, 1994

[30] Foreign Application Priority Data
Feb. 16, 1993 [JP] Japan .................. 5-026405

[51] Int. Cl.$^6$ .............. B29C 45/00; B29C 47/00; A23G 1/22; A23G 1/20
[52] U.S. Cl. ............. 264/266; 264/510; 425/112; 425/129.1
[58] Field of Search ................ 264/266, 510, 264/511; 425/112, 129.1

[56] References Cited

U.S. PATENT DOCUMENTS 5,128,090  7/1992  Fujii et al. ................ 264/511
5,238,640  8/1993  Masui et al. ................ 264/266

FOREIGN PATENT DOCUMENTS

| 0186016 | 7/1986 | European Pat. Off. . |
| 0451447 | 10/1991 | European Pat. Off. . |
| 59-150740 | 8/1984 | Japan . |
| 2015627 | 5/1986 | Japan . |
| 61-137714 | 6/1986 | Japan . |
| 61-132330 | 6/1986 | Japan . |
| 2217227 | 8/1990 | Japan . |

Primary Examiner—Jan H. Silbaugh
Assistant Examiner—Robin S. Gray
Attorney, Agent, or Firm—Watson Cole Stevens Davis, P.L.L.C.

[57] ABSTRACT

A process is provided for producing a skin-integrated laminate using a mold assembly in which a female mold 1 is arranged above and facing a male mold 2 so as to be freely brought close to and away from the male mold, wherein the female mold 1 and the male mold 2 are arranged so as to form an end opening at the peripheral end of a cavity 11 when they are clamped, a plate mold 4 having an end-forming pointed end part 5 which can enter the above end opening is also provided, and the end of the skin material allowed to exist between the male mold 2 and the female mold 1 is clamped with a clamping mechanism 3 which can be freely opened and closed, whereby the skin material is adhered integratedly in layer to the molded synthetic resin substrate from its one side to the other end surface simultaneously with the forming of the substrate and whereby a skin-integrated laminate exhibiting a good appearance, whose skin material does not shrink even after the molding, can be produced in a good efficiency, and a mold assembly to be used therein is also provided.

1 Claim, 3 Drawing Sheets

PROCESS FOR PRODUCING SKIN-INTEGRATED LAMINATE

TECHNICAL FIELD

This invention relates to a process for producing a skin-integrated laminate in which a skin is accurately integratedly adhered in layer to a molded synthetic resin substrate from its one side to the other end surface and to a mold assembly for use therein.

BACKGROUND ART

A skin-integrated laminate in which a skin material is adhered integratedly in layer to one side of a molded synthetic resin substrate is widely used for interior automotive trims, for example, automotive door trim and the like. Recently, however, there is a tendency that the diversification of designs and the like is accompanied by needs of molded synthetic resin substrate having such a complicated shape that turnup is present around the molded substrates. In such articles, a skin material is required to be accurately adhered integrately in layer to the molded synthetic resin substrate from its one side to its edge, namely end surface. However, a method has heretofore been adopted by which a divided mold which slides horizontally to the end surface is used to force a skin material to the end surface to thereby wrap the end surface in the skin material as disclosed in, for example, Japanese Patent Application Kokai No. 61-137,714.

However, in a method as mentioned above, the skin material in the state that its end is clamped by a clamping mechanism is forcibly extended and integrated with the end surface of the molded synthetic resin substrate, and therefore, there has been such a problem that the residual stress of the skin material after the molding and the thermal shrinkage accompanying the heat resistance test cause the skin material to shrink, whereby such a phenomenon that the molded synthetic resin substrate layer inside the skin material exposes is caused to make the appearance bad. Also, there has been such a problem that since the special divided mold must be used, the molding process is complicated and the apparatus per se is also complicated.

DISCLOSURE OF THE INVENTION

This invention has been completed for the purpose of solving the prior art problems mentioned above and providing a process for producing a skin-integrated laminate exhibiting a high quality by which simultaneously with the forming of a molded synthetic resin substrate, the molded substrate is firmly wrapped in a skin material to its end surface and the skin material is adhered integratedly in layer to the molded substrate, whereby a high quality skin-integrated laminate exhibiting excellent appearance, whose skin material does not shrink even after the molding can be produced in a good efficiency, wherein the apparatus per se used has a very simple structure and its maintenance and inspection and the like can be easily conducted and also providing a mold assembly to be used therein.

Figure 1:
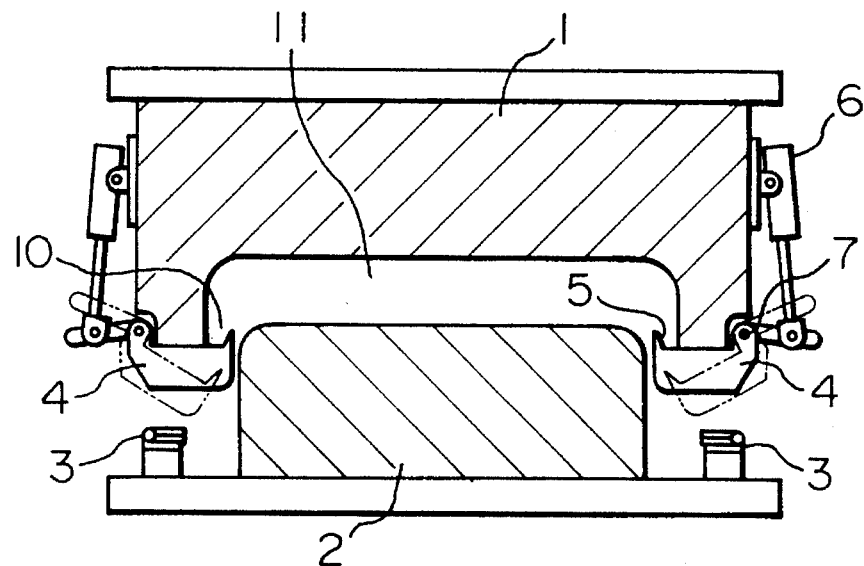
FIG. 1 is a longitudinal front view showing an example of the mold assembly of this invention.

Incidentally, in the drawings, symbols have the following meanings:

1 Female mold
2 Male mold
3 Clamping mechanism
4 Plate mold
5 Pointed end part for forming the end surface
10 End opening
11 Cavity
20 Skin-integrated laminate
21 Skin material
22 Synthetic resin substrate

BEST MODE FOR CARRYING OUT THE INVENTION

This invention made for solving the above-mentioned problems includes, as a first invention, a process for producing a skin-integrated laminate which comprises setting a skin material whose end is clamped by a clamping mechanism between a pair of female and male molds, simultaneously feeding a molten resin for molding a substrate to be integrated with the skin material between the skin material and the male mold, clamping the molds to mold a skin-integrated laminate in which the skin is integrated with the surface of the molded synthetic resin substrate, characterized in that the peripheral end of the cavity formed between the male mold and the female mold is opened as an end opening to the exterior in the clamped state; in the periphery between both the molds, a plate mold whose end-forming pointed end part can enter the above-mentioned end opening is arranged so as to be moved freely forward and backward; the end opening is closed by the plate mold whose end-forming pointed end part has entered the cavity from the end opening; when a molten resin material is fed, the clamping of the skin material by the above-mentioned clamping mechanism is loosened to allow a part of the skin material to reach the back of the end-forming pointed end part in the cavity by the extension of the molten resin material; and simultaneously with forming a molded synthetic resin substrate in the cavity, the substrate is wrapped with the skin material from its one side to the other end surface and, as a second invention, a mold assembly for use in the first invention and for use in the production of a skin-integrated laminate which comprises a male mold 2, a female mold 1 which forms a cavity 11 having as an end opening 10 the internal peripheral end and which is arranged so as to face the male mold and be freely brought close to and away from the male mold, a plate mold 4 having an end surface-forming pointed end part 5 which can enter the end opening 10, said plate mold being arranged so as to turn freely on the outer peripheral portion of the lower end of the female mold, and a clamping mechanism which is arranged so as to be freely opened and closed in the periphery of the lower part of the male mold and can grasp and fix the end of the skin material allowed to exist between the male mold and the female mold.

WORKING EXAMPLES

This invention is explained in detail below based on the working examples shown in the figures.

1 and 2 are a pair of female and male molds constituting a cavity for forming a laminate, and this female mold 1 is arranged above and facing the male mold 2 fixed on a base so that they can be freely brought close to and away from each other and can form, in the clamped state, a cavity 11 whose peripheral end is opened as an end opening 10 between them. 3 is a clamping mechanism arranged on the periphery of the lower part of the male mold 2, and this clamping mechanism 3 can be freely opened and closed so as to clamp the end of a skin material 21 allowed to exist between the above-mentioned male mold 2 and female mold 1. 4 is a plate mold mounted on the outer periphery of the lower end of the above-mentioned female mold 1 so as to turn freely and is provided with an upward, end-surface-forming, pointed end 5 which can enter the above end opening 10.

The above clamping mechanism 3 is, in the working example, such as to clamp the skin material 21 with a pair of claws actuated by an air cylinder; however, any other mechanism such as a mechanism capable of grasping the skin material by vacuum sticking by suction of air or the like can be used. Also, it may be of a loose clamping type in which when a tensile force higher than a certain level is applied to the skin material 21 the grasping force is loosened. Meanwhile, the plate mold 4 is installed in the lower end part of the outer periphery of the female mold 1 so as to turn freely, and this plate mold 4 is so constructed as to be connected to an air cylinder 6 to turn freely on a hinge 7 and take two states, in one of which the cavity 11 is closed and in the other the cavity is opened.

Next, a process for producing a skin-integrated laminate 20 using a mold assembly so constructed as mentioned above is explained referring to the drawings.

Figure 2:
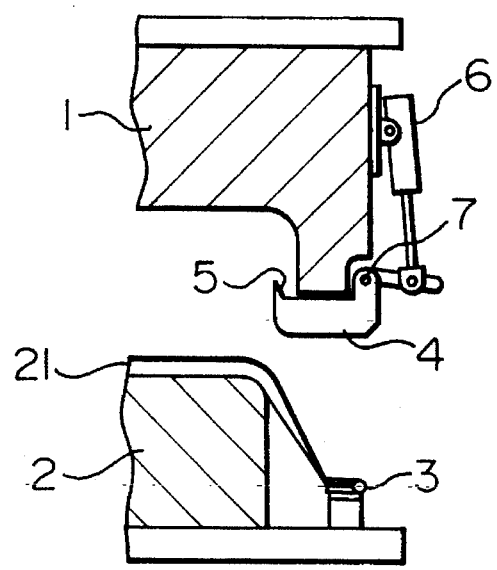
FIG. 2 is a process-explaining view of an example of the process of this invention showing a step in which a skin material is set.
Figure 6:
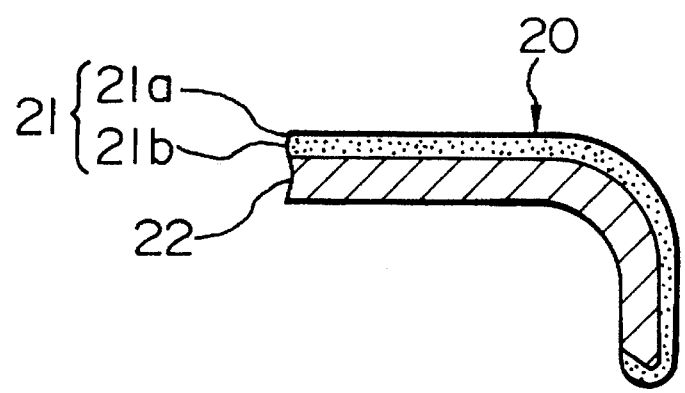
FIG. 6 is a sectional view of a skin-integrated laminate produced by the process of this invention.

First of all, in the state that the female mold 1 is elevated as shown in FIG. 2, a skin material 21 consisting of a soft sheet layer 21a of a polyvinyl chloride or the like and a pad layer 21b of an olefin type such as polypropylene foam, polyethylene foam or the like as shown in FIG. 6 is arranged between the male mold 2 and the female mold 1 and is set so that its end portion is clamped with the clamping mechanism 3. Incidentally, at this time, the plate mold 4 is kept in the horizontal state, namely the closed state, by the actuation of the air cylinder 6.

Figure 3:
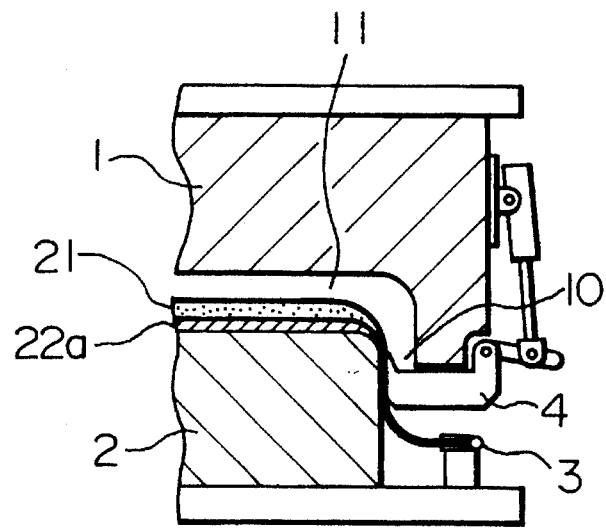
FIG. 3 is a process-explaining view of an example of the process of this invention showing a step in which a molten resin material as a substrate is fed.
Figure 4:
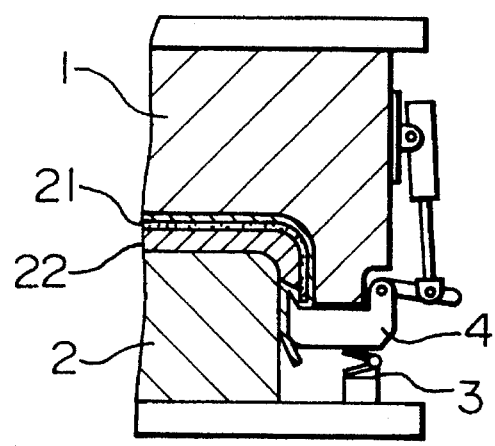
FIG. 4 is a process-explaining view of an example of the process of this invention showing a step in which a male mold and a female mold are clamped.

Subsequently, as shown in FIG. 3, in the clamping step in which the female mold 1 is lowered and then a molten resin material 22a for molding a substrate is fed to between the male mold 2 and the skin material 21 from a material-feed orifice (not shown) or the like provided in the male mold 2, the clamping of the skin material 21 with the above-mentioned clamping mechanism 3 is loosened, upon which the molten resin material 22a fed under pressure to the cavity 11 extends the skin material 21 existing in the cavity 11 to the back of the end surface-forming pointed end part 5 of the plate mold 4 positioned in the cavity 11, whereby it follows that the molded synthetic resin substrate 22 is formed and simultaneously the skin material is adhered integratedly in layer to the substrate from its one side to the other end surface. During this, the clamping of the end of the skin material 21 is loosened, so that the end surface of the molded synthetic resin substrate 22 is wrapped in the skin material in the natural state in which no tensile force acts thereon without being wrapped in the forcibly extended state as before, to be thereby integrated with the molded synthetic resin substrate 22. In addition, the end of the above-mentioned plate mold 4 is shaped into the end surface-forming pointed end part 5, so that it follows that the molded synthetic resin substrate 22 is accurately wrapped along its end surface to its back in the skin material 21.

Figure 5:
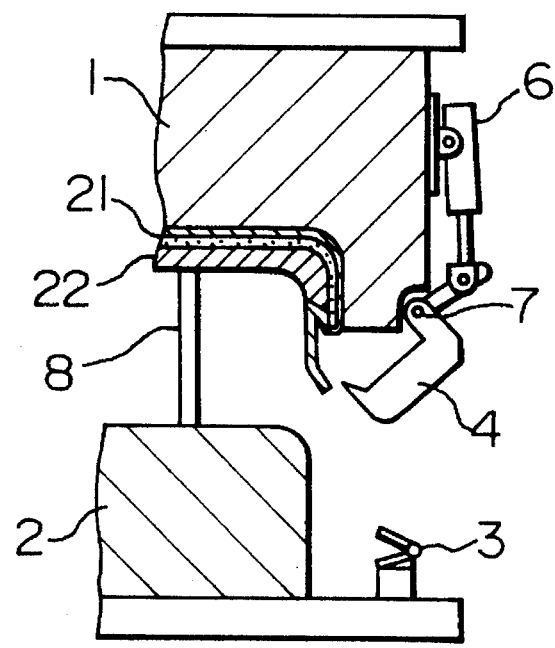
FIG. 5 is a process-explaining view of an example of the process of this invention showing a step in which a molded article is taken out.

Thereafter, the female mold 1 is elevated to open the mold and simultaneously the plate mold 4 is turned, after which the ejector 8 of the male mold 2 is actuated as shown in FIG. 5 to take out the molded article, and the excessive portion attaching to the end surface is trimmed to obtain a skin-integrated laminate 20 in which the molded synthetic resin substrate 22 has been wrapped in the skin material 21 from its one side to the other end surface and the skin material is adhered in layer to the substrate as shown in FIG. 6.

In the skin-integrated laminate 20 thus obtained, the molded synthetic resin substrate 22 is completely covered with the skin material 21 from its one side to the other end surface and the skin material is adhered integratedly in layer to the substrate, and in addition, since the skin material is in the natural state in which no tensile force acts thereon, it follows that the phenomenon is accurately prevented that after the molding, a part of the molded synthetic resin substrate 22 exposes owing to the remaining stress of the skin material 21 or owing to the shrinkage of the skin material due to heat applied thereto in a thermal resistance test.

As is clear from the above explanation, simultaneously with the forming of the molded synthetic resin substrate, the skin material is adhered integratedly in layer to the substrate in the state that the substrate is firmly wrapped in the skin material from its one side to the other end surface, and in addition, no compulsory tensile force is applied to the skin material, so that a high quality skin-integrated laminate exhibiting an excellent appearance whose skin material does not shrink even after the molding can be obtained in a good efficiency. Furthermore, in the second invention, the apparatus per se may have such a very simple structure that the peripheral end of the cavity formed by the male mold and the female mold is opened as the end opening and on the outer periphery of the lower end of the female mold, the plate mold having the end surface-forming pointed end part which can enter the above end opening is mounted so that it can turn freely, and therefore, the apparatus is inexpensive and can be easily maintained and inspected.

Accordingly, this invention has solved the problems of the conventional process for producing a skin-integrated laminate and a mold assembly to be used therein and hence contributes very greatly to the growth of industry.

We claim:

1. A process for producing a skin-integrated laminate in which a skin material is integrated with a surface of a substrate comprising the steps of:

placing a skin material in an open mold assembly between a male mold and a female mold, said female mold having a concave area therein, arranging a pivotable plate mold having an end-forming pointed end part between the male mold and the female mold, pivoting said plate mold having said end-forming pointed end part from a retracted position to a closed position such that said pointed end part of said plate mold protrudes into said concave area of said female mold; closing said open mold assembly while said plate mold is in said closed position to thereby form a cavity between the male mold and the female mold and said plate mold in said closed position, said male mold and said female mold in a clamped state forming a peripheral end opening which opens to an area outside of the cavity, said end opening being closed by said plate mold in said closed position clamping an end of the skin material with a clamping mechanism;

independently clamping the male mold and the female mold after closing said open mold assembly;

then feeding a molten resin material into said cavity between the skin material and the male mold;

loosening the clamping mechanism to release the clamped end of the skin material during said feeding of the molten resin material, thereby forcing a part of the skin material into contact, along a back portion thereof with the end-forming pointed end part of the plate mold to form a substrate and simultaneously wrapping the substrate with the skin material from one side of the substrate to an end surface of the substrate, whereby the skin material is adhered integratedly in a layer to the substrate.

* * * * *